(12) United States Patent
Mathurai et al.

(10) Patent No.: US 10,608,425 B2
(45) Date of Patent: Mar. 31, 2020

(54) ALTERNATING CURRENT OPTIMAL YIELD CONTROL WITHIN A MULTI-POWER STACK INVERTER

(71) Applicant: GE Energy Power Conversion Technology Limited, Rugby (GB)

(72) Inventors: Venkateswaran Mathurai, Chennai (IN); Datatreya Reddy Gollapudi, Chennai (IN); Britto Arputhanathan, Chennai (IN)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 99 days.

(21) Appl. No.: 16/007,741

(22) Filed: Jun. 13, 2018

(65) Prior Publication Data

US 2019/0386482 A1    Dec. 19, 2019

(51) Int. Cl.
  *H02J 1/10*    (2006.01)
  *H02J 3/38*    (2006.01)
  *H02H 7/122*   (2006.01)
  *H02H 1/00*    (2006.01)

(52) U.S. Cl.
  CPC ........ *H02H 7/1227* (2013.01); *H02H 1/0007* (2013.01); *H02J 3/383* (2013.01)

(58) Field of Classification Search
  USPC .......................................................... 307/52
  See application file for complete search history.

(56) References Cited

U.S. PATENT DOCUMENTS 6,285,572 B1    9/2001  Onizuka et al.
8,922,059 B2   12/2014  Yoneda et al.
2005/0105224 A1  5/2005  Nishi

OTHER PUBLICATIONS

Eaton, "Utility-Scale Photovoltaic Inverter Installation and Operation User Manual for Power Xpert Solar 1500/1670 kW Inverter", Oct. 2014. 90 pages.
Kaeser Compressors "Centrifugal Separators" 3 pages from website www.kaeser.com/int-en/products/air-treatment-and-condensate-technology/centrifugal-separators/.
SMA, "Central Invert Operating and Maintenance Manual" Document No. MVPP_OCD-WH-US_en-10 | 98-4032310 | Version 1.0. US, 168 pages.

(Continued)

*Primary Examiner* — Rexford N Barnie
*Assistant Examiner* — Dru Parries
(74) *Attorney, Agent, or Firm* — Wood IP LLC

(57) ABSTRACT

Provided is a method for performing AC optimal yield control within an inverter that includes a plurality of DC power sources configured to supply DC power, a plurality of converters to convert direct current power to alternating current power to be supplied to a load, a plurality of short-circuit protection devices connected to a DC interconnection bus at the DC power sources, and configured to provide short-circuit protection, a plurality of current sensors configured to sense circulation current at the short-circuit protection devices, and a controller. The controller controls the converters and monitors the circulation current sensed along the DC interconnection bus via the current sensors, and when power reduction occurs at one of the DC power sources, performs a closed-loop control current operation to controllably increase the circulation current along the DC interconnection bus to be greater than an impairment lower limit of the short-circuit protection devices.

14 Claims, 4 Drawing Sheets

(56) References Cited

OTHER PUBLICATIONS

Opti-Solar, " Solar Hybrid Inverter SP Power Series", Users Manual, Version 1.1, 44 pages.
SMA Solar Academy, "Inverter in large scale PV plants" SMA Solar Technology AG, Document No. P-P-INV-1_DE-en_WW-123610, 129 pages.
Solectria Renewables, "Installation and Operation Manual, Commercial, Grid-Tied Photovotaic Inverters", 2010 DOC-020099 rev 041, 42 pages.
SGW Werder GmbH & Co. KG, "Centrifugal Force Sediment Separator (FSA)", Product Sheet. 8 pages.
Parker, "890GT-S Series Outdoor Central Solar Inverter", Document No. HA473461 Rev13 May 2017, 12 pages.

ALTERNATING CURRENT OPTIMAL YIELD CONTROL WITHIN A MULTI-POWER STACK INVERTER

I. TECHNICAL FIELD

The present invention relates generally to inverters. In particular, the present invention relates to AC optimal yield control of parallel stacked inverters deployed with passive short circuit protection between interconnected DC bus.

II. BACKGROUND

Traditional multi-power stack solar inverters are used to convert direct current (DC) power into alternating current (AC) power to be supplied for commercial and residential use. The DC power source can be a solar battery (e.g., a plurality of solar cell arrays). The multi-stack includes a plurality of power stacks (e.g., power converters) operating together to produce the AC power to be supplied.

Multi-power stacked solar inverters typically employ passive short-circuit protection devices between an interconnected DC bus. The purpose of such an arrangement is to avoid the consequence of short circuit scenario in a particular power converters DC bus propagating to other power converters. But during an uncertain situation where the interconnected DC power sources (e.g., PV arrays) were not proportional, it naturally results in uncontrolled current circulation between interconnected DC bridges via the passive short-circuit protection devices. This situation can damage the short-circuit protection circuit itself. Hence these inverters limit delivered AC power in proportion to a minimum DC power extracted from different DC power sources (e.g., PV arrays). But de-rating the power converter to avoid this issue will successively degrade the ultimate AC power produced. The possibility of occurrence is so high as environmental conditions (e.g., clouds) can affect one or more of the PV arrays every day.

III. SUMMARY OF THE EMBODIMENTS

Given the aforementioned deficiencies, needed is an inverter and method that allow the inverter to increase the delivered alternating current (AC) power by increasing the current flowing via the short-circuit protection devices within the aggregated inverter in a controlled manner. This process desirably simultaneously controls the current flow by using a closed loop current control operation that controllably increases, yet deterministically limits, the circulation current at the short-circuit protection devices. In this manner, the limitation in power production due to mismatch in power availability of the different DC sources (e.g., PV arrays) supplying DC power to the inverter, is balanced at the aggregated power converter level.

According to one embodiment, an inverter is provided. The inverter includes a includes a plurality of DC power sources configured to supply DC power, a plurality of converters to convert direct current power to alternating current power to be supplied to a load, a plurality of short-circuit protection devices connected to a DC interconnection bus at the DC power sources, and configured to provide short-circuit protection, a plurality of current sensors configured to sense circulation current at the short-circuit protection devices, and a controller. The controller controls the converters and monitors the circulation current sensed along the DC interconnection bus via the current sensors, and when power reduction occurs at one of the DC power sources, performs a closed-loop current control operation to controllably increase the circulation current along the DC interconnection bus slightly lesser than the short-circuit protection device impairment limit or equivalent to the continuous current rating of the short-circuit protection devices, and thus leveraging the continuous current rating of the protection circuits in a systematic method to increase the ultimate power delivered at the AC side.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components.

In other instances, well-known components, apparatuses, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

As noted above, the embodiments provide a system and method for automatic power control of multi-stack converters within a solar inverter, for example a single-stage, 1500V DC class, parallel stacked, air cooled solar inverter. The present invention is not limited to being employed within a particular inverter and can be varied to be suitable for other applications.

Figure 1:
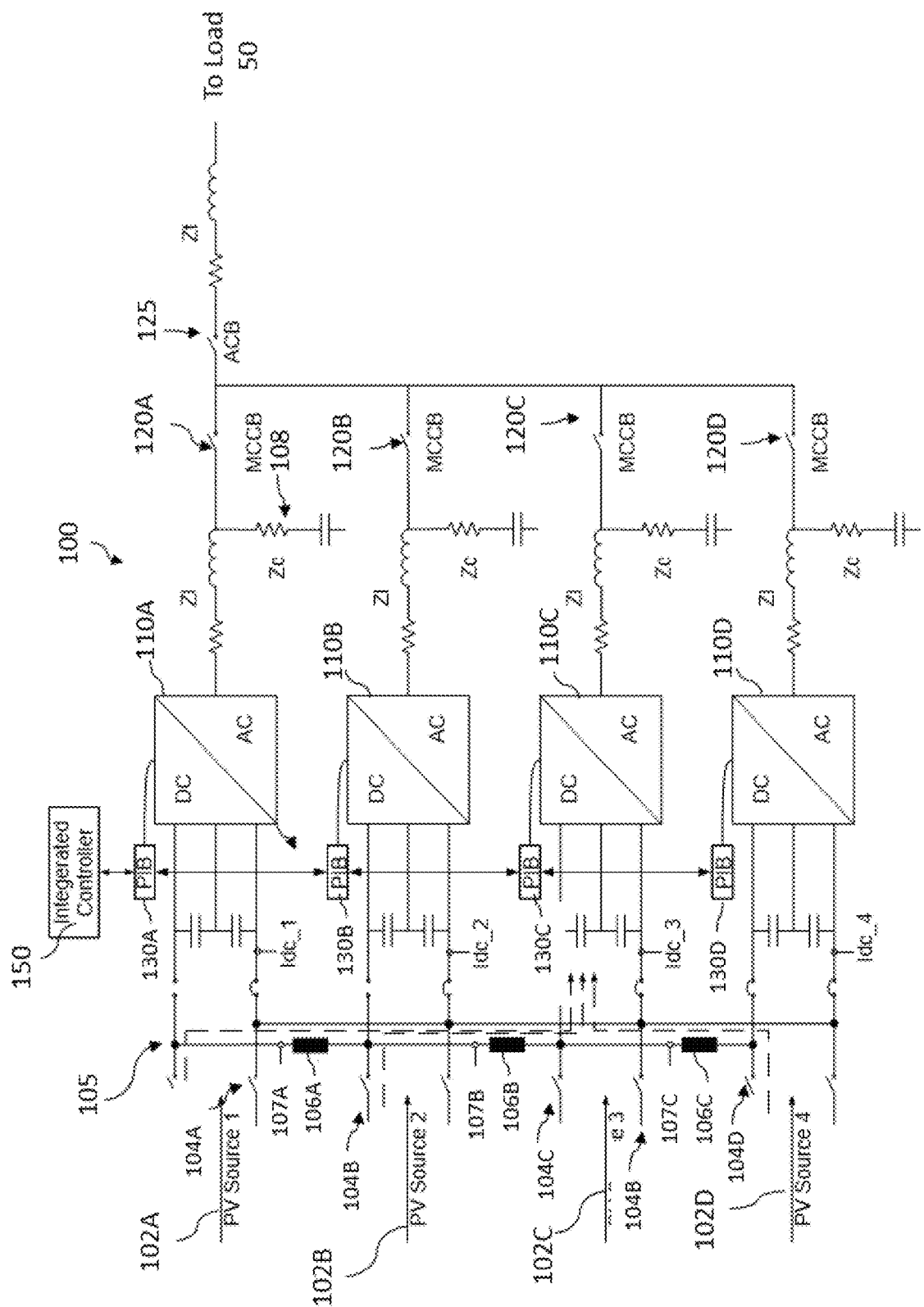
FIG. 1 is an exemplary schematic illustrating an inverter (e.g., a solar inverter) including a plurality of converters in accordance with one or more embodiments of the present invention.

FIG. 1 is a schematic illustrating a solar inverter 100 for supplying AC power to a load 50, that includes photovoltaic (PV) arrays (e.g., a plurality of solar cell arrays) 102A-102D, a plurality of power converters 110A-110D, and a plurality of DC circuit breakers 104A-104D. Also included is a main circuit breaker 125 connected to the AC circuit breakers 120A-120D and supplying the AC power direction to a load 50.

Each PV array 102A-102D is a DC power source formed of a solar cell string having a plurality of solar cell modules connected together, and having an output power. The solar inverter 100 is configured to transform the DC power supplied by each PV array 102A-102D into AC power via the plurality of converters 110A-110D.

The DC circuit breakers 104A-104D are connected to a DC inter connection bus 105 including a plurality of short-circuit protection devices 106A-106C for providing short-circuit protection. A plurality of current sensors 107A-107C are also provided at each short-circuit protection circuit 106A-106C to measure the current therethrough.

The DC and AC circuit breakers 104A-104D and 120A-120D serve as isolators to independently isolate the individual converters 110A-110D and associated components e.g., PV array 102A-102D and PIBs 130A-130B (to be discussed below) from the remaining healthy converters 110A-110D when a fault occurs.

In the exemplary illustration of FIG. 1, a line filter 108 is connected between each converter 110A-110D and a respective AC circuit breaker 120A-120B. The line filter 108 is a low pass filter which removes noise from the AC current on the line of the respective converter 110A-110D.

The inverters within the plurality of converters 110A-110D are configured to be substantially identical, including the same components. Each converter 110A-110D includes a semiconductor device e.g., an insulated-gate bipolar transistor. According to the embodiments, the converters 110A-110D are DC-to-AC converters although the present invention is not so limited.

The converters 110A-110D can be any type of converters suitable for the purposes set forth herein. Although FIG. 1 illustrates a single-stage, four parallel stacked, DC inter-bridge short-circuit protected converters, the present invention is not limited hereto and can include any particular number and/or type of converters 110A-110D which include corresponding a short-circuit protection devices 106A-106C (e.g., fuses).

The solar inverter 100 further includes a plurality of power interface boards (PIBs) 130A-130D. Each PIB 130A-130D corresponds to a respective converter 110A-110D and is connected to a controller 150. This arrangement is configured to control and monitor the status of each converter 110A-110D.

The PIBs 130A-130D are configured to supply control signals from the controller 150 to the respective converter 110A-110D when received.

Figure 2:
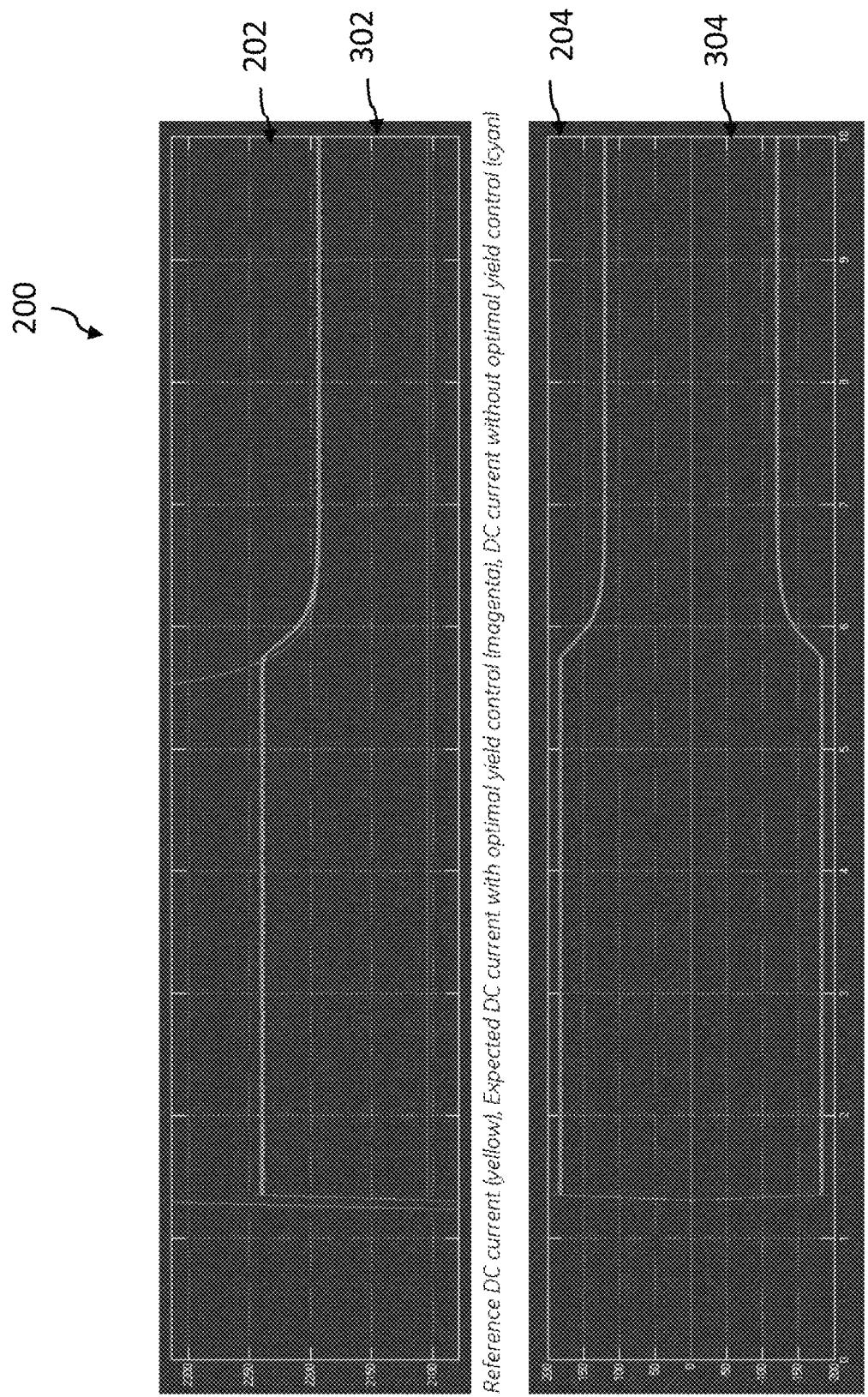
FIG. 2 is a chart illustrating the result of an exemplary method of AC optimal yield control where an aggregated inverter of FIG. 1, connected to different DC power sources is controlling itself to optimize the delivered AC current compared to other DC power sources that can be implemented within the embodiments.
Figure 3:
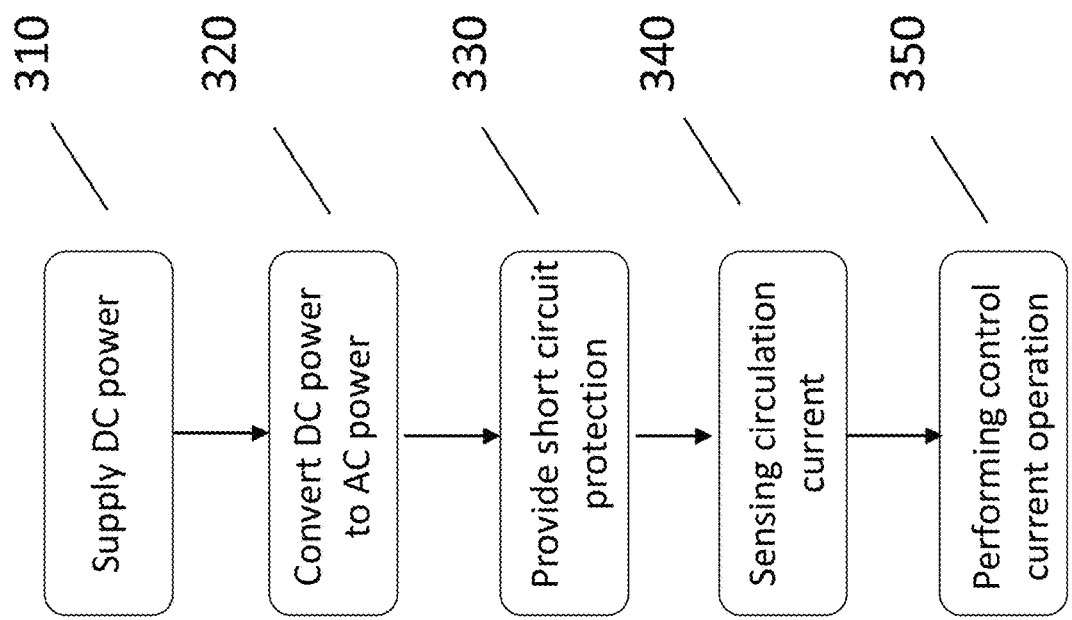
FIG. 3 is a flow chart illustrating an exemplary method of AC optimal yield control in an inverter having a plurality of converters as shown in FIG. 1, in accordance with the embodiments.

According to exemplary embodiments of the present invention, as shown in FIGS. 2 and 3, the controller 150 is an integrated power electronic input/output (I/O) controller having a dual core central processing unit (CPU) and a plurality of ethernet ports to be connected to the PIBs 130A-130D. The resent invention, however, is not limited to an integrated power electronic I/O controller.

In FIG. 1, during normal operation, the DC breakers 104A-104D are closed and the PV arrays 102A-102D are supplying DC power directly to the converters 110A-110D. The DC power is converted at the converters 110A-110D and the noise is removed via each line filter 108. The AC circuit breakers 120A-120D are closed, along with the main AC circuit breaker 125, to allow AC power to be supplied to the load 50 (e.g., a utility grid).

If the DC power to be supplied from the PV arrays 102A-102D is reduced at any one of the PV arrays 102A-102D, for example, due to impaired weather conditions, the controller 150 is configured to control the current detected at the short-circuit protection devices 106A-106C. This control occurs via the current sensors 107A-107C through a closed-loop control technique to limit the circulation current based on the continuous current rating of the short-circuit protection devices 106A-106C. By optimizing the current, the total AC power supplied to the load 50 can be increased irrespective of the reduction in DC power generated by one or more of the PV arrays 102A-102D.

The controller 150 is configured to perform the closed-loop current control operation as a function of the following exemplary expression:

$$I_{ib\_max} = \frac{\max(|I_{ib_{12}}|, |I_{ib_{23}}|, |I_{ib_{34}}|)}{I_{ib\_fuse\_rating_{Continous\,Current}}} > 1$$

(Fuse inpairement limit)

Wherein $I_{ib\_max}$ is the maximum circulation current, $I_{ib12}$ is the current sensed at the current sensor 107C, $I_{ib23}$ is the current sensed at the current sensor 107B, and $I_{ib34}$ is the current sensed at the current sensor 107C. The maximum circulation current $I_{ib\_max}$ is lesser than the fuse impairment limit of the short-circuit protection devices 106A-106C.

$$I_r = (I_{limit} - I_{load}) \cdot I_{ib\_max}$$

Wherein $I_r$ is the residual load current of the aggregated inverter scaled up to the measured maximum inter-bridge circulating current.

$$I_{res_t} = \begin{cases} I_{limit}, & I_{res_t} > I_{limit} \\ I_{res_{t-1}} + G \cdot dT \cdot \left( \frac{I_{r_t} + I_{r_{t-1}}}{2} - \frac{I_{res_{t-1}} + I_{res_{t-2}}}{2} \right), & I_{r_t} < I_{res_t} < I_{limit} \\ I_{r_t}, & I_{res_t} < I_{r_t} \end{cases}$$

Wherein $I_{res}$ is the closed loop AC residual current calculation technique that will be deployed in this method to have current limiting functionality dynamic, but current allowing functionality filtered, to avoid fluctuations in generated load current.

As shown in FIG. 2, an exemplary graph 200 illustrates an example of a method of AC optimal yield control. In the example of FIG. 2, a DC power source 102C (PV Source 3) of the inverter of FIG. 1, is generating less power compared to other DC power sources 102A, 102B and 102D (PV Source 1, PV Source 2 and PV Source 4) as shown in FIG. 1, and the control technique deterministically allows the currents at points 204 and 304 flowing from 102A, 102B and 102C (PV Source 1, PV Source 2 and PV Source 4) to 102C (PV source 3) via short-circuit protective devices 106B and 106C.

As shown, when the availability of power is comparatively lesser at the DC power source 102C, the controller 150 increases the DC current input to 2240 Amps (A) at point 202 until the current at the current sensors 107A, 107B and 107C (as depicted FIG. 1) reaches a set point value of 180 A at point 204. Without the controller 150 performing the optimal yield control of the circulation current, the DC current would be limited to 2100 A shown at point 302 while the current at the bus 105 reaches a set point value of 180 A at point 304.

FIG. 3 is a flow chart illustrating an exemplary method 300 of AC optimal yield control in an inverter having a plurality of converters, as depicted in FIG. 1. In FIG. 3, the method 300 begins supplying DC power, via a plurality of DC power sources at operation 310. At operation 320, a plurality of converters converts DC power to AC current power to be supplied to a load. At operation 330 short circuit protection is provide via a plurality of short-circuit protection devices connected to a DC interconnection bus at the plurality of DC power sources.

At operation 340, the method 300 continues by sensing, via a plurality of current sensors a circulation current at the short-circuit protection devices along the DC interconnection bus. At operation 350, when power reduction occurs at one of the plurality of DC power sources, performing a closed-loop control current operation is performed to controllably increase the circulation current along the DC interconnection bus to be almost equal to an impairment limit of the plurality of short-circuit protection devices. The closed-loop control current operation performed by the controller can be performed using the above-mentioned equation.

Figure 4:
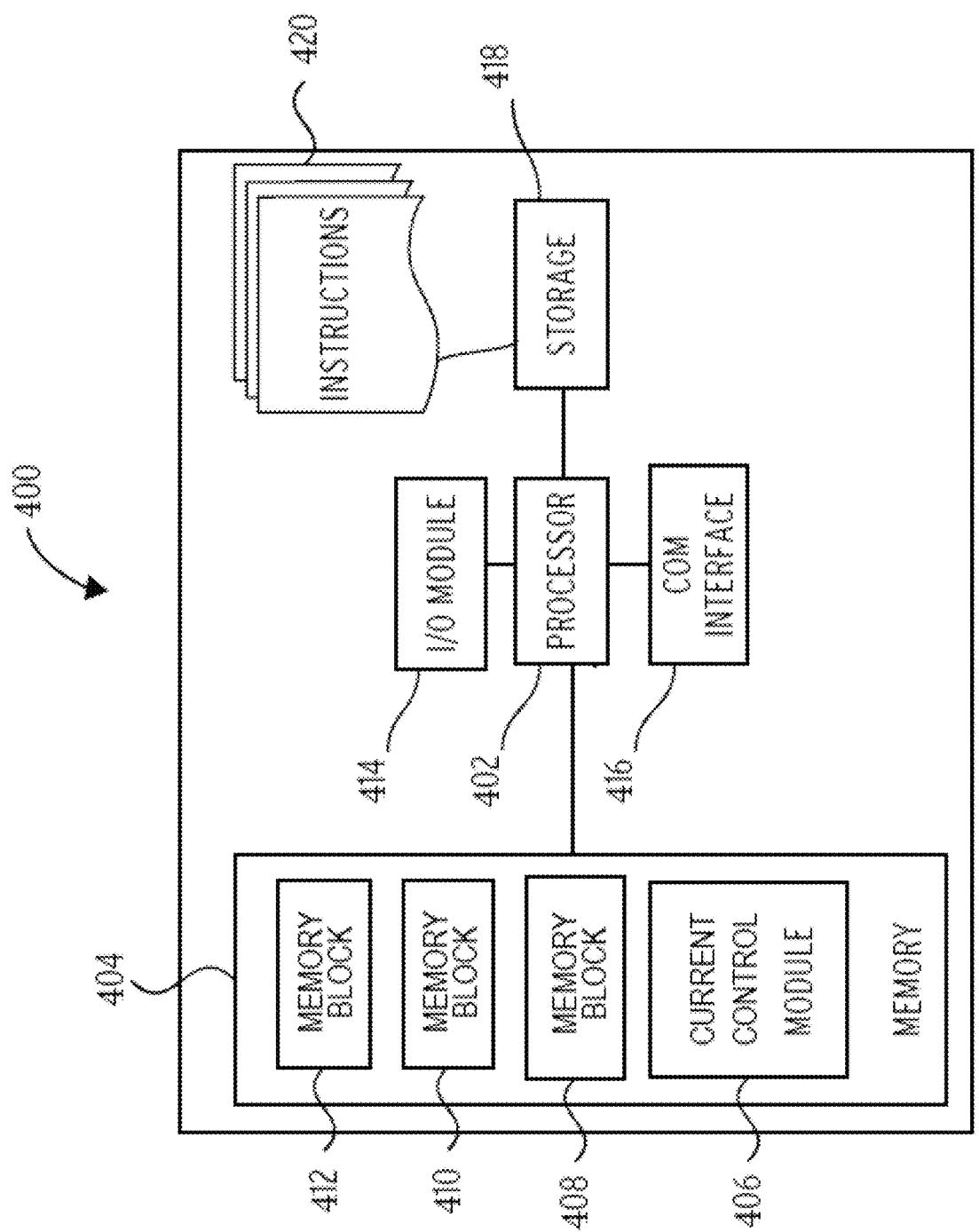
FIG. 4 is a block diagram illustration of an exemplary computer system upon which aspects of embodiments of the present invention may be practiced.

FIG. 4 shows a block diagram of computer controller 400, upon which aspects of the present invention may be implemented, such step 350 of FIG. 3. The computer controller 400 includes a processor 402 that has a specific structure. The specific structure is imparted to the processor 402 by instructions stored in a memory 404 included therein and/or by instructions 420 that can be fetched by the processor 402 from a storage medium 418.

The storage medium 418 may be co-located with controller 400 as shown, or it may be located elsewhere and be communicatively coupled to the controller 400. The controller 400 can be a stand-alone programmable system, or it can be a programmable module located in a much larger system. For example, the controller 400 may be integrated, i.e., embedded within an electric circuit.

The controller 400 may include one or more hardware and/or software components configured to fetch, decode, execute, store, analyze, distribute, evaluate, diagnose, and/or categorize information. Furthermore, the controller 400 can include an I/O module 414 that configured to interface with a plurality of remote devices, such as a driver controller module of a variable frequency drive, and/or a switch matrix or a by-pass module.

The processor 402 may include one or more processing devices or cores (not shown). In some embodiments, the processor 402 may be a plurality of processors, each having either one or more cores. The processor 402 can be configured to execute instructions fetched from the memory 404, i.e. from one of memory block 412, memory block 410, memory block 408, or current control module 406, or the instructions may be fetched from storage medium 418, or from a remote device connected to controller 400 via communication interface 416.

The present invention provides the advantages of increasing the total AC power produced in the inverter and also avoids impairment of the short-circuit protection components during certain environmental conditions where power may be reduced at one of the DC power sources.

This written description uses examples to disclose the invention including the best mode, and also to enable any person skilled in the art to practice the invention, including making and using any devices or apparatuses and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An inverter comprising:
a plurality of DC power sources configured to supply DC power,
a plurality of converters to convert direct current power to alternating current power to be supplied to a load or utility grid,
a plurality of short-circuit protection devices connected to a DC interconnection bus at the plurality of DC power sources, and configured to provide short-circuit protection,
a plurality of current sensors configured to sense circulation current at the short-circuit protection devices, and
a controller configured to:
  (i) control the plurality of converters and monitor the circulation current sensed along the DC interconnection bus via the current sensors, and
  (ii) when power reduction occurs at one of the plurality of DC power sources, perform a closed-loop control current operation to controllably increase the circulation current along the DC interconnection bus to be nearly equal to a fuse impairment lower limit of the plurality of short-circuit protection devices, wherein the calculation for fuse impairment limit is performed using the following equation:

$$I_{ib\_max} = \frac{\max(|I_{ib12}|, |I_{ib23}|, |I_{ib34}|)}{I_{ib\_fuse\_rating_{ContinousCurrent}}} > 1$$

(Fuse Impairment limit)

wherein $I_{ib\_max}$ is a maximum circulation current, $I_{ib12}$, $I_{ib23}$, and $I_{ib34}$ are current sensed at respective short-circuit protection devices of the DC interconnection bus, wherein the maximum circulation current $I_{ib\_max}$ when greater than one means the inverter has reached above the fuse impairment lower limit or continuous current rating of the short-circuit protection devices.

2. The inverter of claim 1, wherein a residual AC current at the base of inter-bridge circulating current is performed using the following equation:

$$I_r = (I_{limit} - I_{load}) \cdot I_{ib\_max}$$

Wherein $I_r$ is a residual line current computed based on the amplitude of a maximum circulating current measured at the points $I_{ib12}$, $I_{ib23}$, and $I_{ib34}$, $I_{limit}$ is an AC current limit wherein $I_{load}$ is a measured AC current being delivered to the grid.

3. The inverter of claim 2, wherein the closed-loop current control operation is performed using the following equation:

$$I_{res_t} = \begin{cases} I_{limit}, I_{res_t} > I_{limit} \\ I_{res_{t-1}} + G \cdot dT \cdot \left( \frac{I_{r_t} + I_{r_{t-1}}}{2} - \frac{I_{res_{t-1}} + I_{res_{t-2}}}{2} \right), I_{r_t} < I_{res_t} < I_{limit} \\ I_{r_t}, I_{res_t} < I_{r_t} \end{cases}$$

Wherein $I_{res\_t}$ is a residual line current limit at an instance t dynamically computed using a closed-loop control technique as given in the equation, G is a gain control loop and dT is a sampling resolution of the controller.

4. The inverter of claim 1, wherein the plurality of DC power sources comprise a plurality of photovoltaic arrays.

5. The inverter of claim 1, further comprising:
a plurality of direct current circuit breakers each connected between a respective DC power source and an input of a converter of the plurality of converters, and
a plurality of alternating current circuit breakers each connected at each converter and an output of a converter of the plurality of converters.

6. The inverter of claim 5, further comprising a line filter with protection circuits connected at each converter of the plurality of converters and a respective alternating current circuit breaker, and configured to remove noise from the alternating current power at the output of the converter.

7. The inverter of claim 6, further comprising a main alternating current system circuit breaker connected with the plurality of alternating circuit breakers and configured to supply the alternating current power directly to the load.

8. The inverter of claim 7, further comprising a plurality of power interface boards, each corresponding to a respective converter of the plurality of converters, and connected together to interface between the plurality of converters and the controller for controlling operation and monitoring the status of each converter, the plurality of power interface boards, each configured to supply control signals from the controller to plurality of converters.

9. A method for performing AC optimal yield control within an inverter having a plurality of converters and corresponding short-circuit protection devices, the method comprising:
supplying DC power, via a plurality of DC power sources,
converting, via a plurality of converters, direct current power to alternating current power to be supplied to a load or a utility grid,
providing, via a plurality of short-circuit protection devices connected to a DC interconnection bus at the plurality of DC power sources, short-circuit protection,
sensing, via a plurality of current sensors, a circulation current at the short-circuit protection devices along the DC interconnection bus, and
when power reduction occurs at one of the plurality of DC power sources, performing a closed-loop control current operation to controllably increase the circulation current along the DC interconnection bus to be greater than an impairment lower limit of the plurality of short-circuit protection devices, wherein the calculation for fuse impairment limit is performed using the following equation:

$$I_{ib\_max} = \frac{\max(|I_{ib_{12}}|, |I_{ib_{23}}|, |I_{ib_{34}}|)}{I_{ib\_fuse\_rating_{ContinuousCurrent}}} > 1$$

(Fuse Impairment limit)

wherein $I_{ib\_max}$ is a maximum circulation current, $I_{ib12}$, $I_{ib23}$, and $I_{ib34}$ are current sensed at respective short-circuit protection devices of the DC interconnection bus, wherein the maximum circulation current $I_{ib\_max}$ when greater than one means the inverter has reached above the impairment lower limit or continuous current rating of the short-circuit protection devices.

10. The inverter of claim 9, wherein a residual AC current at the base of inter-bridge circulating current is performed using the following equation:

$$I_r = (I_{limit} - I_{load}) \cdot I_{ib\_max}$$

Wherein $I_r$ is a residual line current computed based on the amplitude of a maximum circulating current measured at the points $I_{ib12}$, $I_{ib23}$, and $I_{ib34}$, $I_{limit}$ is a AC current limit wherein $I_{load}$ is a measured AC current being delivered to the utility grid.

11. The inverter of claim 10, wherein the closed-loop control current operation is performed using the following equation:

$$I_{res_t} = \begin{cases} I_{limit}, I_{res_t} > I_{limit} \\ I_{res_{t-1}} + G \cdot dT \cdot \left( \frac{I_{r_t} + I_{r_{t-1}}}{2} - \frac{I_{res_{t-1}} + I_{res_{t-2}}}{2} \right), I_{r_t} < I_{res_t} < I_{limit} \\ I_{r_t}, I_{res_t} < I_{r_t} \end{cases}$$

Wherein $I_{res\_t}$ is a residual line current limit at an instance t dynamically computed using a closed loop control technique as given in the equation wherein G is a gain control loop and dT is a sampling resolution of the controller.

12. The method of claim 9, further comprising:
supplying, via a main circuit breaker connected with a plurality of alternating circuit breakers at the output of the plurality of converters, the alternating current power directly to the load.

13. The method of claim 12, further comprising:
interfacing, via a plurality of power interface boards, the plurality of converters and the controller for controlling operation and monitoring the status of each converter, by supplying control signals from the controller to plurality of converters.

14. An inverter comprising:
a plurality of DC power sources configured to supply DC power,
a pair of parallel single stage, converters to convert direct current power to alternating current power to be supplied to a load or a utility grid,
a short-circuit protection device connected to a DC interconnection bus at the plurality of DC power sources, and configured to provide short-circuit protection,
a current sensor configured to sense circulation current at the short-circuit protection device, and
a controller configured to:
(i) control the pair of converters and monitor the circulation current sensed along the DC interconnection bus via the current sensor, and
(ii) when power reduction occurs at one of the plurality of DC power sources, perform a closed-loop control current operation to controllably increase the circulation current along the DC interconnection bus to be greater than an impairment lower limit of the short-circuit protection device, wherein the calculation for fuse impairment limit is performed using the following equation:

$$I_{ib\_max} = \frac{\max(|I_{ib_{12}}|, |I_{ib_{23}}|, |I_{ib_{34}}|)}{I_{ib\_fuse\_rating_{Continous\ Current}}} > 1 \text{ (Fuse impairement limit)}$$

wherein $I_{ib\_max}$ is a maximum circulation current, $I_{ib12}$, $I_{ib23}$, and $I_{ib34}$ are current sensed at respective short-circuit protection devices of the DC interconnection bus, wherein the maximum circulation current $I_{ib\_max}$ when greater than one means the inverter has reached above the impairment lower limit or continuous current rating of the short-circuit protection devices.

* * * * *